United States Patent [19]
Ryoke et al.

[11] Patent Number: 5,711,772
[45] Date of Patent: Jan. 27, 1998

[54] ABRASIVE MEMBER

[75] Inventors: Katsumi Ryoke; Masaaki Fujiyama, both of Kanagawa-ken, Japan

[73] Assignee: Fuji Photo Film Co., Ltd., Kanagawa, Japan

[21] Appl. No.: 625,342

[22] Filed: Apr. 1, 1996

[30] Foreign Application Priority Data

Mar. 30, 1995 [JP] Japan ................. 7-073498

[51] Int. Cl.$^6$ ........................... B24D 11/00
[52] U.S. Cl. ........................ 51/295; 51/309
[58] Field of Search .............. 51/295, 297, 309; 360/128

[56] References Cited

U.S. PATENT DOCUMENTS

| | | | |
|---|---|---|---|
| 2,581,414 | 1/1952 | Hochberg | 241/22 |
| 2,855,156 | 10/1958 | Hochberg et al. | 241/22 |
| 4,138,229 | 2/1979 | Tadokoro et al. | 51/295 |
| 4,652,958 | 3/1987 | Miyoshi et al. | 360/128 |
| 4,842,618 | 6/1989 | Ito et al. | 51/295 |
| 5,028,242 | 7/1991 | Ito et al. | 51/295 |
| 5,135,546 | 8/1992 | Sato et al. | 51/295 |
| 5,370,718 | 12/1994 | Terazawa et al. | 51/295 |
| 5,456,734 | 10/1995 | Ryoke et al. | 51/295 |

Primary Examiner—Deborah Jones
Attorney, Agent, or Firm—Sughrue, Mion, Zinn, Macpeak & Seas, PLLC

[57] ABSTRACT

An abrasive member comprises a substrate and an abrasive layer, which is constituted of a binder and abrasive grains dispersed therein, wherein the abrasive grains are constituted of sintered α-alumina grains. The abrasive member is capable of abrading a material to be abraded such that no abnormal abrasion scratch may occur on the abraded material.

8 Claims, 1 Drawing Sheet

ABRASIVE MEMBER

BACKGROUND OF THE INVENTION

1. Field of the Invention

This invention relates to an abrasive member comprising a substrate and an abrasive layer, which is constituted of a binder and abrasive grains dispersed therein. This invention particularly relates to an abrasive member, such as a precision abrasive tape, which is suitable for use in abrasive processing of materials to be abraded, such as industrial materials, e.g., magnetic heads, optical fiber terminals, rectifying devices for motors and electric generators, ceramic materials (glass, or the like), and hard disk substrates, which should be abraded such that an arithmetic mean deviation Ra (as specified in JIS B R0601-1982) of the abraded surfaces may be not larger than 100 µm.

2. Description of the Prior Art

The materials to be abraded, such as magnetic heads for magnetic recording video tape recorders, or the like, optical fiber terminals, rectifying devices for motors and electric generators, ceramic materials (glass, or the like), hard disk substrates, color filters for liquid crystals, and IC-related substrates, are abraded by abrasive members, such as abrasive tapes and abrasive disks, for the purposes of planishing, shape adjustment, or protrusion removal.

Ordinarily, during the process for producing a desired material, the abrasive processing is carried out, in which a predetermined portion of the material is abraded by an abrasive member and is thereby imparted with a desired surface smoothness. However, often unexpected, abnormal abrasion scratches occur with the abraded material. In such cases, the quality of the product cannot be kept good due to occurrence of scratches.

As the abrasive grains in abrasive tapes, various kinds of alumina grains have heretofore been utilized. Such alumina grains are described in, for example, Japanese Unexamined Patent Publication Nos. 62(1987)-241671 and 6(1994)-254771. Among the various kinds of alumina grains, in particular, α-alumina grains have heretofore been utilized. As the α-alumina grains, white alumina grains, which are obtained with a crushing process, have heretofore been popular owing to their angular shapes and high grinding power.

The occurrence of abnormal abrasion scratches is caused by (a) dust, debris, or the like, which comes from the ambient atmosphere, (b) grinding chips occurring from the abrasion of the material to be abraded, and/or (c) characteristics of the abrasive member used.

As for the cause (a), in order for the dust, debris, or the like, to be prevented from coming from the ambient atmosphere during the abrasive processing, the occurrence of static electricity should preferably be prevented. For such purposes, for example, the abrasive processing machine may be provided with an ion wind blower. Alternatively, aqueous abrasive processing may be employed. As another alternative, the electrical surface resistance of the abrasive member may be kept low.

In order for the occurrence of abnormal abrasion scratches due to the cause (b) to be eliminated, for example, a cleaning device may be utilized in order to remove the abrasion chips immediately after they occur during the abrasive processing with the abrasive member, such that they may not remain at the abraded portion.

In order for the occurrence of abnormal abrasion scratches due to the cause (c) to be eliminated, it is necessary to remove aggregates from the abrasive grains and to adjust the grain size distribution of the abrasive grains. Specifically, as for the removal of aggregates, it is impossible to remove the large-sized aggregates from the abrasive grains by using a filter having a mesh size not larger than the mean grain size. From the viewpoint of efficiency, it is also difficult to use a filter having a mesh size two times as large as the mean grain size. Also, ordinarily, α-alumina grains used as the abrasive grains are obtained by carrying out levigation classification of the crushed grains, which are referred to as the white alumina (WA). Though the grain size of the white alumina grains obtained from the levigation classification is comparatively uniform, they contain several percent of grains having a size at least three times as large as the mean grain size. The white alumina grains are the crushed grains. Therefore, each of the white alumina grains has angular edges, which cause scratches to occur on the abraded surface during the abrasive processing.

SUMMARY OF THE INVENTION

The primary object of the present invention is to provide an abrasive member, which is capable of abrading a material to be abraded such that no abnormal abrasion scratch may occur on the abraded material.

Another object of the present invention is to provide an abrasive member, which is capable of abrading a material to be abraded such that the product yield in a production process utilizing the abrasive member may be kept high.

The present invention provides an abrasive member comprising a substrate and an abrasive layer, which is constituted of a binder and abrasive grains dispersed therein, wherein the abrasive grains are constituted of fsintered α-alumina grains.

With the abrasive member in accordance with the present invention, the abrasive grains contained in the abrasive layer are constituted of the sintered α-alumina grains. Therefore, the shapes and the grain size distribution of the abrasive grains can be kept appropriate, and the occurrence of scratches on the abraded surface of the abraded material can be prevented. Also, the product yield in the abrasive processing can be kept high.

The present invention will hereinbelow be described in further detail with reference to the accompanying drawing.

DETAILED DESCRIPTION OF THE INVENTION

Figure 1:
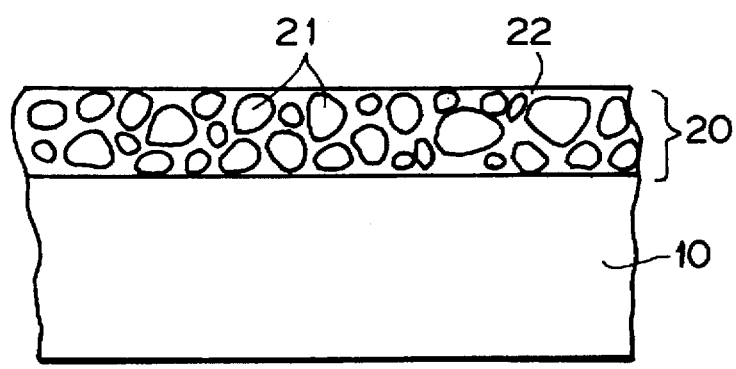
FIG. 1 is a schematic view showing an embodiment of the abrasive member in accordance with the present invention.

With reference to FIG. 1, the abrasive member in accordance with the present invention comprises a substrate 10 and an abrasive layer 20, which is overlaid upon the substrate 10. The abrasive layer 20 is primarily constituted of a binder 22 and fine abrasive grains 21, which are dispersed in the binder 22.

In the abrasive member in accordance with the present invention, as the abrasive grains 21 contained in the abrasive layer 20, sintered α-alumina grains, which are produced with a sintering process, are employed. The sintered α-alumina grains comprise primary grains and secondary grains which are aggregates of the primary grains. The grain diameter of the primary grains comprising α-crystal grains fall within the range of 0.1 µm to 10 µm and the mean grain diameter of the secondary grains comprising aggregates of primary grains falls within the range of 0.1 µm to 100 µm.

The abrasive grains, i.e. the sintered α-alumina grains, should preferably be obtained by dissolving bauxite with sodium hydroxide, removing unnecessary matter, depositing and concentrating aluminum hydroxide, dehydrating and firing the aluminum hydroxide with a rotary kiln, or the like, and thereafter adjusting the grain diameter of the resulting grains with a dispersing process.

In accordance with the production process used, α-alumina grains are roughly classified into the white alumina (WA) grains, which are produced by the crushing process, and the sintered α-alumina grains, which are produced by the sintering process. In the sintering process for producing the sintered α-alumina grains, bauxite serving as the raw material is dissolved with sodium hydroxide and filtered, and aluminum hydroxide is thereby deposited. The size of the aluminum hydroxide forms the grain diameter of the α-crystal grains. The obtained aluminum hydroxide is concentrated and heated in a rotary kiln, and the sintered α-alumina grains are thereby obtained. The sintered α-alumina grains are different from the white alumina grains obtained with the crushing process in that the sintered α-alumina grains are constituted of primary α-crystal grains and their aggregates (secondary grains). The grain diameter of the sintered α-alumina grains successively becomes close to the grain diameter of the primary α-crystal grains when the sintered α-alumina grains are dispersed with a certain level of force. Also, the sintered α-alumina grains have the feature in that the grinding edges of the crystal grains as in the white alumina grains obtained with the crushing process do not appear positively.

After the sintered α-alumina grains have been obtained with the sintering process, the secondary grains (i.e., the crystal aggregates) are subjected to the dispersing process with a ball mill or a sand mill, and the grain size of the sintered α-alumina aggregates is thereby adjusted such that the grain size may become equal to a finally desired grain size. The dispersing process should preferably be carried out until all of the abrasive grains are constituted of the primary grains. In such cases, abrasive grains can be obtained, which have no angular edges and cause no scratch to occur. The adjustment of the grain diameter of the crystal grains may also be carried out with the dispersion processing during the coating composition preparing process, in which the abrasive grains, the binder, and a solvent are mixed and kneaded together. With such dispersion processing, the secondary grains constituted of the crystal aggregates can be converted into the primary grains.

As the abrasive grains, the sintered α-alumina grains may be used in combination with other abrasive grains having a Mohs hardness of not less than 7, such as chromium oxide, silicon carbide, diamond, and artificial (synthetic) diamond. In such cases, the mean grain size must be smaller than the cumulative 90% diameter of the sintered α-alumina grains. If the abrasive grains other than the sintered α-alumina grains are contained in a proportion of not lower than 50% with respect to the total amount of the abrasive grains and the mean grain size is larger than the cumulative 90% diameter of the sintered α-alumina grains, good effects of the angular edge-less, high-dispersibility characteristics of the sintered α-alumina grains cannot be obtained.

The electrical surface resistance of the abrasive layer should preferably be not higher than $1 \times 10^{10} \Omega/SQ$ (and should ordinarily be $1 \times 10^{12} \Omega/SQ$). With the decrease in the electrical surface resistance, the occurrence of scratches due to clinging of dust, debris, or the like, can be reduced owing to the prevention of the occurrence of static electricity.

Also, the binder contained in the abrasive layer should preferably be constituted of a material having at least a single functional group selected from the group consisting of a carboxyl group, a sulfonic acid group, and a phosphoric acid group. In cases where the binder having at least one of these functional groups is used, the dispersibility of the abrasive grains can be kept high, and their aggregation can be prevented. Therefore, the formation of foreign substances and protrusions on the abrasive member can be restricted, and scratches can be prevented from occurring with the abraded material.

Examples of the materials for the substrate 10 include polyesters, such as a polyethylene terephthalate and a polyethylene naphthalate; polyolefins, such as a polypropylene; cellulose derivatives, such as cellulose triacetate and cellulose diacetate; vinyl resins, such as a polyvinyl chloride; plastic materials, such as a polycarbonate, a polyimide, a polyamide, a polysulfone, a polyphenylsulfone, and a polybenzoxazole; metals, such as aluminum and copper; and ceramic materials, such as glass. Before a coating composition is applied onto the substrate, the substrate may be subjected to corona discharge treatment, plasma treatment, prime-coating treatment, heat treatment, dust-resistant treatment, metal vapor evaporation treatment, and/or alkali treatment. The substrates are described in, for example, West Germany Patent No. 3338854A specification, Japanese Unexamined Patent Publication Nos. 59(1984)-116926 and 61(1986)-129731, U.S. Pat. No. 4,388,368, and "Fiber and Industry," by Yukio Mitsuishi, Vol. 31, pp. 50–55, 1975.

In cases where the abrasive member is an abrasive tape, or the like, the arithmetic mean deviation Ra of the substrate should preferably fall within the range of 0.001 μm to 1.5 μm (cut-off value: 0.25 mm). The thickness of the substrate should preferably fall within the range of 2.5 μm to 500 μm, and should more preferably fall within the range of 3 μm to 75 μm. Also, the Young's modulus in either one of the longitudinal direction and the width direction of the substrate should preferably be at least 400 kg/mm$^2$.

As the binder 22 contained in the abrasive layer 20 of the abrasive member in accordance with the present invention, any of binders, in which the proportion of an inorganic salt is not higher than 0.1% by weight, may be used. Examples of these binders include vinyl chloride resins, urethane resins, and polyisocyanates. Examples of these binders also include thermoplastic resins, thermosetting resins, reactive resins, electron beam-curing resins, ultraviolet-curing resins, visible light-curing resins, mildew-proofing resins, and mixtures of two or more of these resins.

The thermoplastic resins, which may be used as the binder in the abrasive layer of the abrasive tape in accordance with the present invention, generally have a softening point of 150° C. or lower, an average molecular weight falling within the range of approximately 10,000 to approximately 300,000, and a polymerization degree falling within the range of approximately 50 to approximately 2,000. The polymerization degrees of the thermoplastic resins should preferably fall within the range of approximately 200 to approximately 700. Specifically, as the thermoplastic resin, it is possible to use, for example, an acrylic ester-acrylonitrile copolymer, an acrylic ester-vinylidene chloride copolymer, an acrylic ester-styrene copolymer, a methacrylic ester-acrylonitrile copolymer, a methacrylic ester-vinylidene chloride copolymer, a methacrylic ester-styrene copolymer, a urethane elastomer, a nylon-silicone resin, a nitrocellulose-polyamide resin, polyvinyl fluoride resin, a vinylidene chloride-acrylonitrile copolymer, a butadiene-acrylonitrile copolymer, a polyamide resin, a polyvinyl butyral resin, a cellulose derivative (such as cellulose acetate butyrate, cellulose diacetate, cellulose triacetate, cellulose propionate, nitrocellulose, ethyl cellulose, methyl cellulose, propyl cellulose, methyl ethyl cellulose, carboxymethyl cellulose, or acetyl cellulose), a styrene-butadiene copolymer, a polyester resin, a polycarbonate resin, a chlorovinyl ether-acrylic ester copolymer, an amino resin, a synthetic rubber type thermoplastic resin, or a mixture of two or more of these compounds.

In particular, examples of the vinyl chloride resins include a vinyl chloride-vinyl acetate-vinyl alcohol copolymer, a vinyl chloride-vinyl alcohol copolymer, a vinyl chloride-vinylidene chloride copolymer, and a vinyl chloride-acrylonitrile copolymer. From the viewpoint of the strength of the abrasive layer and the dispersibility of the abrasive grains, vinyl chloride copolymers having a basic unit of —$(CHClCH_2)_n$—$(CHXCH_2)_m$— (wherein X represents a polar group, such as —$SO_3Na$, —$SO_3H$, or —$PO_4H$) are preferable. Among the vinyl chloride resins, resins particularly preferable from the viewpoint of the dispersibility and the coating film strength are MR110, 400X110A, and the like, supplied by Nippon Zeon Co., Ltd.

As the thermosetting resins or the reactive resins, which may be used as the binder in the abrasive layer of the abrasive tape in accordance with the present invention, there should preferably employed the resins, which have a molecular weight of 200,000 or less when the resins takes on the form of coating compositions, and which exhibit an infinite increase in the molecular weight through the condensation reactions, the addition reactions, or the like, when the coating compositions are heated and humidified after being applied onto substrates and dried. Among these resins, the resins, which do not soften or melt before they decompose thermally, should more preferably be employed. Specifically, examples of the thermosetting resins or the reactive resins include a phenol resin, a phenoxy resin, an epoxy resin, a polyurethane resin, a polyester resin, a polyurethane polycarbonate resin, a urea resin, a melamine resin, an alkyd resin, a silicone resin, an acrylic reactive resin (an electron beam-curing resin), an epoxy-polyamide resin, a nitrocellulose melamine resin, a mixture of a high-molecular weight polyester resin with an isocyanate prepolymer, a mixture of a methacrylate copolymer with a diisocyanate prepolymer, a mixture of a polyester polyol with a polyisocyanate, a urea-formaldehyde resin, a mixture of a low-molecular weight glycol, a high-molecular weight diol and a triphenylmethane triisocyanate, a polyamine resin, a polyimine resin, and a mixture of two or more of these compounds.

As the urethane resins, any of the urethane resins, which are conventionally known as the binder resins, may be used. For example, the urethane resins, which have a 100% modulus falling within the range of 50 kg/mm$^2$ to 300 kg/mm$^2$ and a glass transition temperature (Tg) falling within the range of −30° C. to 50° C., has the performance for retaining the abrasive grains within the abrasive layer, can impart an appropriate level of elasticity to the coating film, and are therefore preferable. Examples of such urethane resins include C-7209 and Pandex, which are supplied by Dainippon Ink and Chemicals, Inc.; N-2301, N-2302, N-2304, and N-3107, which are supplied by Nippon Polyurethane K.K.; and UR-8200, UR-8300, and UR-8600, which are supplied by Toyobo Co., Ltd. In particular, the urethane resins, which have polar groups for promoting the dispersion of the abrasive grains in the molecules, are preferable.

In general, the thermoplastic resins, the thermosetting resins, and the reactive resins described above respectively have the aforesaid functional groups suitable for the present invention and may have one to six kinds of other functional groups. Such that the dispersion of the abrasive grains may be promoted and the strength of the abrasive layer coating film may be kept high, each of the other functional groups should preferably be contained in proportions within the range of $1\times10^{-6}$ equivalent to $1\times10^{-2}$ equivalent per gram of the resin. Examples of the other functional groups include acid groups, such as a carboxylic acid group (COOM), a sulfinic acid group, a sulfenic acid group, a sulfonic acid group ($SO_3M$), a phosphoric acid group [$PO(OM)(OM)$], a phosphonic acid group, a sulfuric acid group ($OSO_3M$), and ester groups with these acids, wherein M represents H, an alkali metal, an alkaline earth metal, or a hydrocarbon group; groups of amphoteric compounds, such as a group of an amino acid, a group of an aminosulfonic acid, a group of a sulfuric ester of amino-alcohol, a group of a phosphoric ester of amino-alcohol, a sulfobetaine form group, a phosphobetaine form group, and an alkyl betaine form group; basic groups, such as an amino group, an imino group, an imido group, and an amido group; a hydroxyl group; an alkoxyl group; a thiol group; an alkylthio group; halogen groups, such as F, Cl, Br, and I; a silyl group; a siloxane group; an epoxy group; an isocyanato group; a cyano group; a nitrile group; an oxo group; an acryl group; and a phosphine group.

In the abrasive member in accordance with the present invention, the binder is contained in the abrasive layer in a proportion falling within the range of 5 to 700 parts by weight per 100 parts by weight of the abrasive grains.

As the polyisocyanates described above, any of the polyisocyanates, which are conventionally known as the binders, may be used. Examples of the polyisocyanates include isocyanates, such as tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate, and triphenylmethane triisocyanate. As the polyisocyanates, it is also possible to use products of reactions between the above-enumerated isocyanates and polyalcohols, and dimer to decamer polyisocyanates produced from condensation of isocyanates, and products which are obtained from reactions between polyisocyanates and polyurethanes and which have isocyanate groups as terminal functional groups. Among the above-enumerated polyisocyanates, the polyisocyanates, which have at least three isocyanate groups (—NCO) in a single molecule, can effect three-dimensional crosslinking and are therefore preferable. The polyisocyanates enumerated above should preferably have an average molecular weight falling within the range of 100 to 20,000.

Such polyisocyanates are commercially available as, for example, Coronate L, Coronate HL, Coronate 2030, Coronate 2031, Myrionate MR, and Myrionate MTL (supplied by Nippon Polyurethane K.K.); Takenate D-102, Takenate D-110N, Takenate D-200, Takenate D-202, Takenate 300S, and Takenate 500 (supplied by Takeda Chemical Industries, Ltd.); Sumidur T-80, Sumidur 44S, Sumidur PF, Sumidur L, Sumidur N, Desmodur L, Desmodur IL, Desmodur N, Desmodur HL, Desmodur T65, Desmodur 15, Desmodur R, Desmodur RF, Desmodur SL, and Desmodur Z4273 (supplied by Sumitomo Bayer K.K.). These polyisocyanates may be used alone, or a mixture of two or more of them may be used by the utilization of differences in curing reaction properties.

Also, in order to promote the curing reaction, compounds having a hydroxyl group (such as butanediol, hexanediol, polyurethane having a molecular weight within the range of 1,000 to 10,000, and water), compounds having an amino group (such as monomethylamine, dimethylamine, and trimethylamine), catalysts, such as metal oxides and iron acetylacetonate, may be used together with the polyisocyanates. The compounds having a hydroxyl group or an amino group should preferably be polyfunctional. Among the above-enumerated polyisocyanates, three-functional polyisocyanates can enhance the three-dimensional crosslinking density and are therefore particularly preferable. Examples of the three-functional polyisocyanates include Coronate 3040 (supplied by Nippon Polyurethane K.K.), and the like.

Other compounds having various functions may be added as additives to the abrasive layer, when necessary. Examples of the additives include dispersing agents, lubricating agents, antistatic agents, antioxidants, mildew-proofing agents, coloring agents, and solvents.

The dispersing agents and dispersion assisting auxiliaries may be used in order to assist the dispersion of the abrasive grains in the binder. As the dispersing agents and the dispersion assisting auxiliaries, it is possible to employ fatty acids having 2 to 40 carbon atoms ($R_1COOH$, wherein $R_1$ represents an alkyl group, a phenyl group, or an aralkyl group, which has 1 to 39 carbon atoms), such as caprylic acid, capric acid, lauric acid, myristic acid, palmitic acid, stearic acid, oleic acid, elaidic acid, linoleic acid, linolenic acid, stearolic acid, behenic acid, maleic acid, and phthalic acid; salts of the above-enumerated fatty acids with alkali metals (Li, Na, K, and the like) or alkaline earth metals (Mg, Ca, Ba, and the like); metallic soaps comprising Cu, Pb, and the like, (e.g., copper oleate); fatty acid amides; and lecithins (e.g., soybean oil lecithin). As the dispersing agents and dispersion assisting auxiliaries, it is also possible to employ higher alcohols having 4 to 40 carbon atoms (e.g., butyl alcohol, octyl alcohol, myristyl alcohol, and stearyl alcohol), sulfuric esters of these higher alcohols, sulfonic acid, phenylsulfonic acids, alkylsulfonic acids, sulfonic esters, phosphoric monoesters, phosphoric diesters, phosphoric triesters, alkylphosphonic acids, phenylphosphonic acids, and amine compounds. As the dispersing agents and dispersion assisting auxiliaries, it is further possible to employ polyethylene glycols, polyethylene oxides, sulfosuccinic acid, sulfosuccinic acid metal salts, and sulfosuccinic esters. Ordinarily, one or more kinds of the dispersing agents are employed. One kind of the dispersing agent is added in proportions falling within the range of 0.005 to 20 parts by weight per 100 parts by weight of the binder. When the dispersing agent is used, it may be adhered to the surfaces of the abrasive grains or may be added during the dispersing process.

Examples of the aforesaid lubricating agents (powdered lubricating agents) include fine grains of inorganic materials, such as graphite, molybdenum disulfide, boron nitride, graphite fluoride, calcium carbonate, barium sulfate, silicon oxide, titanium oxide, zinc oxide, tin oxide, and tungsten disulfide; and fine grains of resins, such as an acryl-styrene resin, a benzoguanamine resin, a melamine resin, a polyolefin resin, a polyester resin, a polyamide resin, a polyimide resin, and a polyfluoroethylene resin.

Further, so that the coefficient of friction may be reduced and the elasticity of the coating film may be controlled, organic compounds of lubricating agents described below may be employed. The proportions of the organic compounds of lubricating agents should fall within the range of 0.01% by weight to 10% by weight with respect to the weight of the abrasive grains, and should preferably fall within the range of 0.05% by weight to 5% by weight with respect to the weight of the abrasive grains. Examples of the organic compound of lubricating agents include compounds into which fluorine or silicon is introduced, such as a silicone oil (e.g., a dialkyl polysiloxane, a dialkoxy polysiloxane, a phenyl polysiloxane, or a fluoroalkyl polysiloxane, which is supplied as KF96, KF69, or the like, by Shin-Etsu Chemical Co., Ltd.), a fatty acid-modified silicone oil, a fluorine alcohol, a polyolefin (e.g., a polyethylene wax or a polypropylene), a polyglycol (e.g., ethylene glycol or a polyethylene oxide wax), a tetrafluoroethylene oxide wax, a polytetrafluoroglycol, a perfluoroalkyl ether, a perfluorofatty acid, a perfluorofatty acid ester, a perfluoroalkylsulfuric ester, a perfluoroalkylsulfonic ester, a perfluoroalkylbenzenesulfonic ester, and a perfluoroalkylphosphoric ester; organic acids and organic acid ester compounds, such as an alkylsulfuric ester, an alkylsulfonic ester, an alkylphosphonic triester, an alkylphosphonic monoester, an alkylphosphonic diester, an alkylphosphoric ester, and a succinic ester; heterocyclic compounds containing nitrogen or sulfur, such as triazaindolizine, tetraazaindene, benzotriazole, benzotriazine, benzodiazole, and EDTA; a fatty acid ester of a monobasic fatty acid having 10 to 40 carbon atoms with one or at least two of a monohydric alcohol, a dihydric alcohol, a trihydric alcohol, a tetrahydric alcohol and a hexahydric alcohol, each alcohol having 2 to 40 carbon atoms; a fatty acid ester of a monobasic fatty acid having at least 10 carbon atoms with such an monohydric, dihydric, trihydric, tetrahydric, pentahydric or hexahydric alcohol that the sum of the number of the carbon atoms of the fatty acid and the number of the carbon atoms of the alcohol may fall within the range of 11 to 70; and fatty acids, fatty acid amides, fatty acid alkyl amides, and aliphatic alcohols, which have 8 to 40 carbon atoms.

Examples of these organic compounds of lubricating agents include butyl caprylate, octyl caprylate, ethyl laurate, butyl laurate, octyl laurate, ethyl myristate, octyl myristate, 2-ethylhexyl myristate, ethyl palmitate, butyl palmitate, octyl palmitate, 2-ethylhexyl palmitate, ethyl stearate, butyl stearate, isobutyl stearate, octyl stearate, 2-ethylhexyl stearate, amyl stearate, isoamyl stearate, 2-ethylpentyl stearate, 2-hexyldecyl stearate, isotridecyl stearate, stearic acid amide, stearic acid alkyl amide, butoxyethyl stearate, anhydrosorbitan monostearate, anhydrosorbitan distearate, anhydrosorbitan tristearate, anhydrosorbitan tetrastearate, oleyl oleate, oleyl alcohol, lauryl alcohol, montan wax, and carnauba wax. The above-enumerated compounds may be used alone, or two or more of them may be used in combination.

The aforesaid antistatic agents are used in order to prevent electrostatic breakage due to static electricity occurring between the abrasive member and the material to be abraded. As the antistatic agents, carbon black should preferably be employed. As the carbon black, furnace black for rubber, thermal black for rubber, coloring black, acetylene black, or the like, may be used. Besides the use as the antistatic agent, the carbon black is also used as a light blocking agent, a friction coefficient regulating agent, and a durability enhancement agent. Examples of the carbon black materials include, expressed by acronyms referred to in United States, SAF, ISAF, IISAF, T, HAF, SPF, FF, FFF, HMF, GPF, APF, SRF, MPF, ECF, SCF, CF, FT, MT, HCC, HCF, MSF, LFF, and RCF. The carbon black materials classified in the ASTM Standard, D-1765-82a, may be employed. Among the above-enumerated carbon black materials, such that the objects of the present invention may be accomplished efficiently, the furnace black satisfying the below-described conditions with respect to the grain diameter should preferably be used.

The carbon black employed in the abrasive member in accordance with the present invention may have a mean grain diameter falling within the range of 5 nm to 1,000 nm (as measured with an electron microscope), a specific surface area falling within the range of 1 $m^2$/g to 800 $m^2$/g (as measured with the nitrogen adsorption method), a pH value falling within the range of 4 to 11 (as measured with the JIS K-6221-1982 method), and a dibutyl phthalate (DBP) oil absorption falling within the range of 10 ml/100 g to 800 ml/100 g (as measured with the JIS K-6221-1982 method). In the abrasive member in accordance with the present invention, in order to decrease the electrical surface resistance of the coating film, a carbon black having a mean grain diameter falling within the range of 5 nm to 100 nm may be employed. Also, in cases where the strength of the coating film is to be controlled, a carbon black having a mean grain diameter falling within the range of 50 nm to 1,000 nm may be employed.

The kind of the carbon black and the amount of the carbon black added are selected in accordance with the characteristics which the abrasive member is required to have. The carbon black may be subjected to surface treatment with the aforesaid dispersing agent, or the like, or may be grafted with a resin. It is also possible to employ a carbon black having been treated at a furnace temperature of at least 2,000° C. during the production of the carbon black such that a portion of the carbon black surface may be graphitized. Further, as a specific carbon black, a hollow carbon black may be employed. The carbon black should preferably be added in proportions falling within the range of 0.1 to 100 parts by weight per 100 parts by weight of the inorganic grains of the abrasive layer. In cases where the carbon black is employed in a backing layer, which is overlaid upon the back surface of the substrate in order to reduce friction, it should preferably be added in proportions falling within the range of 20 to 400 parts by weight per 100 parts by weight of a resin. As for the carbon black which may be employed in the abrasive tape in accordance with the present invention, reference may be made to, for example, "Carbon Black Handbook," published by Carbon Black Society, 1971.

As for powder materials other than the abrasive grains (aluminum oxide), which may be used in the present invention, the "Na content," which is calculated in terms of NaO, in each powder material should preferably be at most 0.1% by weight.

Examples of the antistatic agents other than carbon black, which may be employed in the abrasive member in accordance with the present invention, include conductive grains, such as grains of graphite, modified graphite, carbon black graft polymer, tin oxide-antimony oxide, tin oxide, and titanium oxide-tin oxide-antimony oxide; natural surface active agents, such as saponin; nonionic surface active agents, such as an alkyleneoxide. compound, a glycerin compound, a glycidol compound, a polyhydric alcohol, a polyhydric alcohol ester, and an adduct of an alkyl phenol with ethylene oxide; cationic surface active agents, such as a higher alkylamine, a cyclic amine, a hydantoin derivative, an amidoamine, an ester amide, a quaternary ammonium salt, a heterocyclic compound, e.g. pyridine, a phosphonium compound, and a sulfonium compound; anionic surface active agents containing acidic groups, such as a carboxylic acid group, a sulfonic acid group, a phosphonic acid group, a phosphoric acid group, a sulfuric ester group, a phosphonic ester group, and a phosphoric ester group; and amphoteric surface active agents, such as an amino acid, an amino sulfonic acid, a sulfate or a phosphate of an amino alcohol, and an alkyl betaine compound.

Several examples of the surface active agents, which may be employed as the antistatic agents, are described in, for example, "Synthesis and Applications of Surface Active Agents" by Ryohei Oda, et al., Tsubaki Shoten, 1972; "Surface Active Agents" by A. W. Bailey, Interscience Publication Incorporated, 1958; "Encyclopedia of Surface Active Agents, Vol. 2" by T. P. Sisley, Chemical Publish Company, 1964; "Surface Active Agent Handbook", sixth edition, Sangyo Tosho K.K., Dec. 20, 1966; and "Antistatic Agents" by Hideo Marushige, Saiwai Shobo, 1968. The surface active agents may be used alone, or two or more of them may be used in combination. These surface active agents are used as the antistatic agents. The surface active agents may also be used for purposes other than as the antistatic agents, for example, for dispersion, for improvement of lubricating properties, as coating assisting auxiliaries, as wetting agents, as hardening accelerators, and as dispersion accelerators.

As the aforesaid antioxidants, it is possible to employ metal chelating agents, which are generally known as anticorrosive agents, such as an alkyl phenol, benzotriazine, tetraazaindene, sulfamide, guanidine, nucleic acid, pyridine, amine, hydroquinone, and EDTA; rust preventives, such as naphthenic acid, alkenylsuccinic acid, and dilauryl phosphate; oiliness improvers, such as colza oil and lauryl alcohol; and extreme pressure additives, such as dibenzyl sulfide, tricresyl phosphate, and tributyl phosphite. These compounds are also used as detergent-dispersants, viscosity index improvers, pour point depressants, and foaming preventives. These antioxidants are added in proportions falling within the range of 0.01 to 30 parts by weight per 100 parts by weight of the binder.

Examples of the aforesaid mildew-proofing agents include 2-(4-thiazolyl)-benzimidazole, N-(fluorodichloromethylthio)-phthalimide, 10,10'-oxybisphenoxarsine, 2,4,5,6-tetrachloroisophthalonitrile, p-tolyldiiodomethylsulfone, triiodoallyl alcohol, dihydroacetonic acid, mercury phenyloleate, bis(tributyltin) oxide, and salicylanilide. Such compounds are described in, for example, "Microbial Calamity and Preventing Technique," published by Kogaku Tosho, 1972; and "Chemistry and Industry," Vol. 32, p. 904, 1979.

As the aforesaid coloring agents, it is possible to use industrial coloring matter utilized for dyes and pigments, such as phthalocyanine coloring matter, cyanine coloring matter, and chelate coloring matter.

The aforesaid solvents may be used in any proportion during the dispersing, kneading, and coating processes. Examples of the solvents include ketones, such as acetone, methyl ethyl ketone, methyl isobutyl ketone, cyclohexanone, and isophorone; alcohols, such as methyl alcohol, ethyl alcohol, propyl alcohol, butyl alcohol, isobutyl alcohol, isopropyl alcohol, and methylcyclohexanol; esters, such as methyl acetate, ethyl acetate, butyl acetate, isobutyl acetate, isopropyl acetate, ethyl lactate, and glycol acetate monoethyl ether; ethers, such as diethyl ether, tetrahydrofuran, ethylene glycol dimethyl ether, ethylene glycol monoethyl ether, and dioxane; aromatic hydrocarbons, such as benzene, toluene, xylene, cresol, chlorobenzene, and styrene; chlorinated hydrocarbons, such as methylene chloride, ethylene chloride, carbon tetrachloride, chloroform, ethylene chlorohydrin, and dichlorobenzene; N,N-dimethylformamide, hexane, and water. Ordinarily, two or more of the above-enumerated solvents are used in combination in arbitrary proportions. The solvents may contain small amounts of impurities (e.g., polymerization products of the solvents, moisture, and raw material constituents of the solvents) in proportions of not larger than 1% by weight.

Ordinarily, the solvents are used in proportions falling within the range of 100 to 20,000 parts by weight per 100 parts by weight of the total solids of the coating composition. The solid contents of the coating composition should preferably fall within the range of 1% by weight to 70% by weight.

During the formation of the abrasive member, the abrasive grains, the binder, the additives, and the like, are taken in arbitrary proportions and mixed together in the solvent. The resulting mixture is kneaded and subjected to dispersion, and an abrasive layer coating composition is thereby obtained. The coating composition is then coated onto the substrate and dried, and the abrasive layer is thereby formed on the substrate. The substrate, on which the abrasive layer has been formed, is cut into a desired shape, e.g. a tape-like shape. The surfaces of the thus obtained abrasive member are then cleaned.

No limitation is imposed on how the mixing, dispersing, and kneading processes are carried out. The order, in which the constituents (the resins, the grains, the lubricants, the solvents, and the like) are added, the timing, with which the constituents are added during the mixing, dispersing, and kneading processes, the temperature at which the dispersing process is carried out (and which will ordinarily fall within the range of 0° C. to 80° C.), and the like, may be selected appropriately. Ordinary stirring machines, dispersing machines, and kneading machines may be used in order to prepare the coating composition (the abrasive coating composition). For example, it is possible to use a twin roll mill, a triple roll mill, a ball mill, a pebble mill, a trommel, a sand grinder, a Szegvari attritor, a high-speed impeller machine, a high-speed stone mill, a high-speed impact mill, a disperser, a kneader, a high-speed mixer, a ribbon blender, a Ko-kneader, an intensive mixer, a tumbler, a blender, a homogenizer, a single-screw extruder, a twin-screw extruder, or an ultrasonic dispersing machine.

Ordinarily, a plurality of the above-enumerated machines are used, and the mixing, dispersing, and kneading processes are carried out continuously. Details of the dispersing and kneading techniques are described in, for example, "Paint Flow and Pigment Dispersion," by T. C. Patton, John Wiley & Sons, 1964; "Industrial Materials," by Shin-ichi Tanaka, Vol. 25, p. 37, 1977; and literature cited in these publications. As auxiliary means for the dispersing and kneading techniques, steel balls, steel beads, ceramic beads, glass beads, and organic polymer beads, which have sizes equivalent to sphere diameters of 0.05 mm to 10 cm, may be used in order to carry out the dispersing and kneading processes efficiently. The shapes of these materials are not limited to spheres. These materials are described in, for example, U.S. Pat. Nos. 2,581,414 and 2,855,156. In the present invention, the coating composition for the abrasive layer and the coating composition for the backing layer may be prepared by carrying out the dispersing and kneading processes in accordance with the methods described in the aforesaid publications, the literature cited therein, and the like.

The coating composition for the abrasive layer may be applied onto the substrate with a coating technique, a spraying technique, or the like. In cases where the coating technique is employed, the viscosity of the coating composition may be adjusted at a value falling within the range of 1 to 20,000 centistrokes at 25° C. The coating composition may be applied onto the substrate by using any of coating apparatuses, for example, an air doctor coater, a blade coater, an air-knife coater, a squeeze coater, an impregnation coater, a reverse-roll coater, a transfer roll coater, a gravure coater, a kiss-roll coater, a cast coater, a spray coater, a rod coater, a forward-rotation roll coater, a curtain coater, an extrusion coater, a bar coater, or a lip coater. The other coating methods may also be used. The coating methods are described in, for example, "Coating Engineering," published by Asakura Shoten, pp. 253–277, Mar. 20, 1971. Before the desired coating composition is applied to the substrate, a prime-coating layer may be applied, or corona discharge treatment, or the like, may be carried out in order to enhance the adhesion to the substrate.

In cases where a plurality of abrasive layers are to be formed, simultaneous multi-layer coating, successive multi-layer coating, or the like, may be carried out. Such coating methods are described in, for example, Japanese Unexamined Patent Publication Nos. 57(1982)-123532, 59(1984)-142741, and 59(1984)-165239, and Japanese Patent Publication No. 62(1987)-37451.

With the methods described above, the coating composition for the abrasive layer is applied to a thickness of, for example, approximately 1 μm to approximately 1,000 μm on the substrate. The applied coating composition is then immediately dried at temperatures of 20° C. to 130° C., and thereafter the formed abrasive layer is dried to a thickness of 0.1 μm to 100 μm. At this time, ordinarily, conveyance of the substrate is carried out at a conveyance speed of 10 to 900 m/minute, the drying temperatures in a plurality of drying zones are adjusted at 20° C. to 130° C., and the amount of the solvent remaining in the coating film is set at 0.1 to 40 mg/m$^2$. When necessary, other layers may be formed with the same procedure. A surface smoothing process, or the like, is then carried out. The abrasive member web is then cut into a desired shape, and the abrasive member in accordance with the present invention is thereby produced. In such cases, pre-treatment and surface treatment of powder, such as the abrasive grains, kneading and dispersing, coating, orientation, drying, smoothing, heat treatment, EB treatment, surface cleaning, and cutting processes, as well as a winding process should preferably carried out continuously (in cases where the abrasive member is an abrasive tape, it is wound up around a desired plastic or metal reel).

In the final process or a process prior to the final process, the abrasive layer, the backing layer, the edge faces, and the base surface of the abrasive member should preferably be burnished and/or cleaned. The burnishing process is carried out in order to adjust the surface roughness and the abrasive power of the abrasive member. Specifically, protrusions on the surface of the abrasive member are scraped out, and the surface of the abrasive member is thereby made uniform or smooth by using a hard material, such as a sapphire blade, a shaving blade, a hard material blade, a diamond blade, or a ceramic blade. No limitation is imposed on the hardness of the material used for the burnishing process, and any of materials, which can remove protrusions on the surface of the abrasive member, may be employed. However, the Mohs hardness of the material used for the burnishing process should preferably be 8 or higher. The materials need not necessarily take on the form of blades and may have any of other shapes, such as square, round, and wheel shapes. (The material may be provided on the circumferential surface of a rotatable cylindrical wheel.)

The cleaning process is carried out in order to remove foreign substances, excessive lubricating agents, and the like, from the surface of the abrasive member. For this purpose, the surface layers of the abrasive member, i.e., the abrasive layer surface, the backing layer surface, the edge surfaces, the base surface on the back side, and the like, are wiped with a nonwoven fabric, or the like. As the wiping materials, it is possible to use, for example, various Vilene products supplied by Japan Vilene Co., Ltd., Toraysee and Ecsaine supplied by Toray Industries, Inc., a material available as Kimwipe (trade name), a nylon nonwoven fabric, a polyester nonwoven fabric, a rayon nonwoven fabric, an acrylonitrile nonwoven fabric, a mixed nonwoven fabric, and tissue paper.

Basically, the abrasive member in accordance with the present invention comprises the substrate and the abrasive layer, which is overlaid upon the substrate. The abrasive member in accordance with the present invention may also comprise the backing layer, an intermediate layer, and a separation preventing layer, i.e. a prime-coating layer, which is located between the respective layers. The backing layer, the intermediate layer, and the prime-coating layer are formed in order to control the friction, the elasticity, and the adhesion strength. The backing layer is overlaid upon the back surface of the substrate, i.e. the surface opposite to the abrasive layer. The intermediate layer containing no abrasive grains is formed between the substrate and the abrasive layer. The prime-coating layer is formed in order to enhance the strength of adhesion between two adjacent layers. As for the materials constituting the respective layers, the same raw materials as those of the abrasive layer may be employed. Also, two or more abrasive layers, which contain the abrasive grains having different sizes or of different kinds, may be formed.

As for how to produce the abrasive member in accordance with the present invention, reference may be made to, for example, the method for making a magnetic recording medium, which is disclosed in Japanese Patent Publication No. 56(1981)-26890.

EXAMPLES

The present invention will further be illustrated by the following examples, in which the abrasive member in accordance with the present invention takes on the form of an abrasive tape. It will be apparent to experts in the art that the kinds and proportions of the constituents, working procedures, and the like, described in the examples may be varied without departing from the spirit and scope of the present invention. Therefore, the present invention is not limited to the examples described below. In these examples, the term "parts" means parts by weight.

Examples 1, 2, 3, and 4

A prime-coating layer constituted of a polyester polyurethane resin was applied to a thickness of 0.1 μm onto a polyethylene terephthalate (PET) substrate having a thickness of 25 μm. A coating composition for an abrasive layer was prepared by subjecting the constituents described below to a dispersing process for two hours, in which a sand grinder and a glass beads dispersing medium were used. The coating composition for the abrasive layer was applied with a bar coating process onto the prime-coating layer such that the dry thickness of the abrasive layer might be 5 μm. The coating composition was then dried. In this manner, samples of abrasive tapes were prepared. As the abrasive grains contained in the abrasive layer, the sintered α-alumina grains were employed. In Example 1, the sintered α-alumina grains having a mean grain size (i.e., the mean size of the primary grains plus the secondary grains) of 0.2 μm were used. In Example 2, the sintered α-alumina grains having a mean grain size of 0.5 μm were used. In Example 3, the sintered α-alumina grains having a mean grain size of 1.0 μm were used. Also, in Example 4, the sintered α-alumina grains having a mean grain size of 5.0 μm were used.

Further, in comparative examples, samples of abrasive tapes were prepared in the same manner by using the crushed α-alumina grains (i.e., white alumina grains) as the abrasive grains. In Comparative Example 1, the crushed α-alumina grains having a mean grain size of 0.2 μm were used. In Comparative Example 2, the crushed α-alumina grains having a mean grain size of 0.5 μm were used. In Comparative Example 3, the crushed α-alumina grains having a mean grain size of 1.0 μm were used. Also, in Comparative Example 4, the crushed α-alumina grains having a mean grain size of 5.0 μm were used.

Tests were carried out for the abrasive tapes, which were prepared in Examples 1, 2, 3, and 4, and the abrasive tapes, which were prepared in Comparative Examples 1, 2, 3, and 4. The results shown in Table 1 were obtained. In the tests, a Ni—P-plated aluminum substrate (a hard disk substrate) serving as a material to be abraded was abraded with each abrasive tape, and the arithmetic mean deviation Ra of the abraded surface was measured. Also, the number of scratches, which occurred on the abraded surface, were counted. The arithmetic mean deviation Ra was measured with Tailor Hobson's Tarystep. In cases where a roughness curve of a reference length L is represented by y=f(x), the arithmetic mean deviation Ra is calculated with the formula $$Ra = (1/L) \left\{ \int_{1}^{L} |y = f(x)| dx \right\}.$$

The number of scratches was counted under a green lamp. The conditions of the abrasive processing were such that the rotation speed was 100 rpm, the abrasive tape feed rate was 150 mm/minute, and the abrasive processing time was 20 seconds.

| Coating composition: | |
|---|---|
| Abrasive grains (α-alumina, Mohs hardness: 9) | 100 parts |
| Binder resin (polyester polyurethane, containing sodium sulfonate in a proportion of 1 × 10⁻³ equivalents per g of the resin, Mw: 70,000) | 8 parts |
| Polyisocyanate (a reaction product of 3 mols of tolylene diisocyanate with 1 mol of trimethylolpropane) | 2 parts |
| Lubricating agent (oleic acid/oleyl oleate) | 0.1 part |
| Diluting agent (methyl ethyl ketone/cyclohexanone = 2/1) | 200 parts |
| Diluting agent (toluene/MIBK) | 150 parts |
| Additive (carbon black) | 2 parts |

TABLE 1

| | Alumina | Mean grain size | Ra (μm) of abraded material | Number of scratches |
|---|---|---|---|---|
| Example 1 | Sintered | 0.2 | 0.0020 | 0 |
| Example 2 | Sintered | 0.5 | 0.0030 | 0 |
| Example 3 | Sintered | 1.0 | 0.0050 | 0 |
| Example 4 | Sintered | 5.0 | 0.0160 | 0 |
| Comp. Ex. 1 | Crushed (WA) | 0.2 | 0.0020 | 5 |

TABLE 1-continued

|  | Alumina | Mean grain size | Ra (μm) of abraded material | Number of scratches |
|---|---|---|---|---|
| Comp. Ex. 2 | Crushed (WA) | 0.5 | 0.0030 | 6 |
| Comp. Ex. 3 | Crushed (WA) | 1.0 | 0.0050 | 8 |
| Comp. Ex. 4 | Crushed (WA) | 5.0 | 0.0160 | 11 |

As is clear from the results shown in Table 1, the arithmetic mean deviation Ra of the abraded surface of the abraded material is in proportion to the mean grain size of the abrasive grains and takes the same value for the Examples in accordance with the present invention and the Comparative Examples. However, no scratches occur in Examples 1, 2, 3, and 4 in accordance with the present invention, wherein the sintered α-alumina grains are used. On the other hand, in Comparative Examples 1, 2, 3, and 4, wherein the crushed α-alumina grains are used, more scratches occur with the abrasive tapes in which the mean grain size of the crushed α-alumina grains is larger.

Example 5

A prime-coating layer constituted of a polyester polyurethane resin was applied to a thickness of 0.1 μm onto a polyethylene terephthalate (PET) substrate having a thickness of 30 μm. A coating composition for an abrasive layer was prepared by subjecting the constituents described below to a dispersing process for four hours, in which a sand grinder and a glass beads dispersing medium were used. The coating composition for the abrasive layer was applied with a bar coating process onto the prime-coating layer such that the dry thickness of the abrasive layer might be 5 μm. The coating composition was then dried. In this manner, a sample of abrasive tape was prepared. As the abrasive grains contained in the abrasive layer, the sintered α-alumina grains were employed. In Example 5, the sintered α-alumina grains having a mean grain size of 0.2 μm were used.

Further, in Comparative Example 5, a sample of abrasive tape was prepared in the same manner by using the crushed α-alumina grains (i.e., white alumina grains) as the abrasive grains. The crushed α-alumina grains having a mean grain size of 0.2 μm were used.

Tests were carried out for the abrasive tape, which was prepared in Example 5, and the abrasive tape, which was prepared in Comparative Example 5. The results shown in Table 2 were obtained. In the tests, a magnetic head (normal VHS head) used for a magnetic recording video tape recorder was abraded with each abrasive tape, and the occurrence of flaws on the abraded surface was investigated. In cases where flaws of at least 100 μm occurred on the abraded surface of the magnetic head, the magnetic head was rated as being a defective. The defective occurrence rate (in %) was calculated. A head abrading machine was used, and the conditions of the abrasive processing were such that the rotation speed was 1,800 rpm, the abrasive tape feed rate was 40 mm/minute, and the abrasive processing time was 20 seconds.

| Coating composition: | |
|---|---|
| Abrasive grains (α-alumina, Mohs hardness: 9) | 100 parts |
| Binder resin (polyester polyurethane, | 15 parts |

| Coating composition: | |
|---|---|
| containing sodium sulfonate in a proportion of $1 \times 10^{-3}$ equivalents per g of the resin, Mw: 70,000) | |
| Polyisocyanate (a reaction product of 3 mols of tolylene diisocyanate with 1 mol of trimethylolpropane) | 5 parts |
| Lubricating agent (stearic acid/butyl stearate) | 0.1 part |
| Diluting agent (methyl ethyl ketone/cyclohexanone = 2/1) | 200 parts |
| Diluting agent (toluene/MIBK) | 150 parts |
| Additive (carbon black) | 2 parts |

TABLE 2

|  | Alumina | Mean grain size | Defective occurrence rate (%) |
|---|---|---|---|
| Example 5 | Sintered | 0.2 | 0 |
| Comp. Ex. 5 | Crushed (WA) | 0.2 | 2 |

As is clear from the results shown in Table 2, the rate of occurrence of flaws on the abraded surface of the magnetic head varies for different kinds of α-alumina grains used as the abrasive grains. No defective occurs with the magnetic heads abraded by the abrasive tape of Example 5 in accordance with the present invention, wherein the sintered α-alumina grains are used. On the other hand, defectives of 2% due to flaws occur with the magnetic heads abraded by the abrasive tape of Comparative Example 5, wherein the crushed α-alumina grains are used.

What is claimed is:

1. An abrasive member comprising a substrate and an abrasive layer, said abrasive layer comprising a binder and abrasive grains dispersed therein, wherein said abrasive grains comprise sintered α-alumina grains.

2. An abrasive member as defined in claim 1 wherein said sintered α-alumina grains have a grain diameter within the range of 0.1 μm to 10 μm.

3. An abrasive member as defined in claim 1 wherein said sintered α-alumina grains have a diameter within the range of 0.1 μm to 100 μm.

4. An abrasive member as defined in claim 1 wherein said sintered α-alumina grains are obtained from a process of heating aluminum hydroxide, and the grain diameter of said sintered α-alumina grains obtained is then adjusted by a dispersing process.

5. An abrasive member as defined in claim 2 wherein said sintered α-alumina grains are obtained from a process of heating aluminum hydroxide, and the grain diameter of said sintered α-alumina grains having been obtained is then adjusted by a dispersing process.

6. An abrasive member as defined in claim 3 wherein said sintered α-alumina grains are obtained from a process of heating aluminum hydroxide, and the grain diameter of said sintered α-alumina grains obtained is then adjusted by a dispersing process.

7. An abrasive member as defined in claim 1 wherein said binder comprises a material having at least a single functional group selected from the group consisting of a carboxyl group, a sulfonic acid group, and a phosphoric acid group.

8. An abrasive member as defined in claim 1 wherein said abrasive layer has an electrical surface resistivity of at most $1 \times 10^{10} \Omega/SQ$.

* * * * *